US007021492B2

(12) United States Patent
Priebe et al.

(10) Patent No.: US 7,021,492 B2
(45) Date of Patent: Apr. 4, 2006

(54) PILL AND CAPSULE COUNTER AND DISPENSER

(75) Inventors: Robert N. Priebe, Bloomington, MN (US); Terrance O. Noble, Burnsville, MN (US)

(73) Assignee: Apothecary Products, Inc., Burnsville, MN (US)

( * ) Notice: Subject to any disclaimer, the term of this patent is extended or adjusted under 35 U.S.C. 154(b) by 339 days.

(21) Appl. No.: 10/654,632

(22) Filed: Sep. 2, 2003

(65) Prior Publication Data

US 2004/0074916 A1 Apr. 22, 2004

Related U.S. Application Data

(63) Continuation-in-part of application No. 10/086,976, filed on Mar. 1, 2002, now Pat. No. 6,821,079.

(51) Int. Cl.
*B65G 59/00* (2006.01)

(52) U.S. Cl. ....................... 221/296; 414/675; 414/901

(58) Field of Classification Search ................ 221/296, 221/7, 13, 93, 264; 414/675, 901
See application file for complete search history.

(56) References Cited

U.S. PATENT DOCUMENTS 2,623,647 A 12/1952 Erickson
2,863,572 A 12/1958 Bethard et al.
3,662,904 A 5/1972 Tune
4,018,358 A 4/1977 Johnson et al.
4,047,620 A 9/1977 Deininger
4,167,091 A * 9/1979 Ruppert et al. ............... 53/149
4,451,324 A * 5/1984 Ichikawa et al. ........... 156/562
4,597,091 A 6/1986 Blake
4,685,271 A 8/1987 Ringer et al.
6,196,426 B1 3/2001 White

OTHER PUBLICATIONS

"Apothecary Products, Inc.," "The Ultimate Pharmacy Buyer's Guide to Drug Specialties," pp 288-293 (Sep. 2001).
"Spin-Count™ Pill and Capsule Counter," Apothecary Products, Inc., 2 pages (1996).
Instructions For Use Of The "Shake & Roll Speedee Tablet/Capsule Counter,"™ Apothecary Products, Inc., 3 pages, Date Unknown.

* cited by examiner

*Primary Examiner*—David H. Bollinger
(74) *Attorney, Agent, or Firm*—Merchant & Gould, P.C.

(57) ABSTRACT

A device for rapidly counting and dispensing pills and capsules in blister packs or cards is provided. A movable plate with apertures, a sizing guide and a template fit inside a housing. The sizing guide has apertures corresponding to a particular size of pill or capsule, allowing the desired number of pills or capsules to be counted in a first section of the housing. When the excess pills or capsules are removed, the counted pills or capsules are transferred to the template containing a blister pack by moving the plate and placing its apertures in register with the sizing guide apertures.

17 Claims, 22 Drawing Sheets

PILL AND CAPSULE COUNTER AND DISPENSER

This application is a continuation-in-part of U.S. application Ser. No. 10/086,976, filed Mar. 1, 2002, now U.S. Pat. No. 6,821,079 which is incorporated by reference herein in its entirety.

BACKGROUND OF THE INVENTION

The invention relates to an apparatus for counting and dispensing pills and capsules of different sizes. Various devices for counting pills have been made, ranging from a simple tray with a pouring spout to large devices for automatically counting hundreds or thousands of pills. The simple trays provide rapid dispensing of the counted pills, but require manual counting. The automatic counting devices eliminate the need for manual counting, but are generally not practical for counting a small number of pills, and are often difficult to clean.

SUMMARY OF THE INVENTION

The invention provides an automatic counting device that allows for rapid counting of either pills or capsules, dispensing the pills or capsules into a container or unit dose packages, allows for simple return of excess pills or capsules to the stock bottle, and is easily cleaned. The counting device includes a housing, a movable plate, and a removable sizing guide. In one embodiment, the housing has an opening for delivering the counted pills to a prescription bottle. In another embodiment, the device includes a removable template for holding a blister pack card, and the housing has an opening for receiving the removable template. The housing may additionally have a second opening for returning excess pills to a stock bottle.

The movable plate divides the housing into an upper section where the pills are counted, and a lower section for transferring the counted pills to a prescription bottle or blister pack card. The removable sizing guide fits over the movable plate and has apertures that align with apertures in the movable plate when the movable plate is moved to a second position, allowing counted pills or capsules to pass through to the lower section of the housing for dispensing into a prescription bottle or blister pack card.

DETAILED DESCRIPTION OF THE INVENTION

Figure 1:
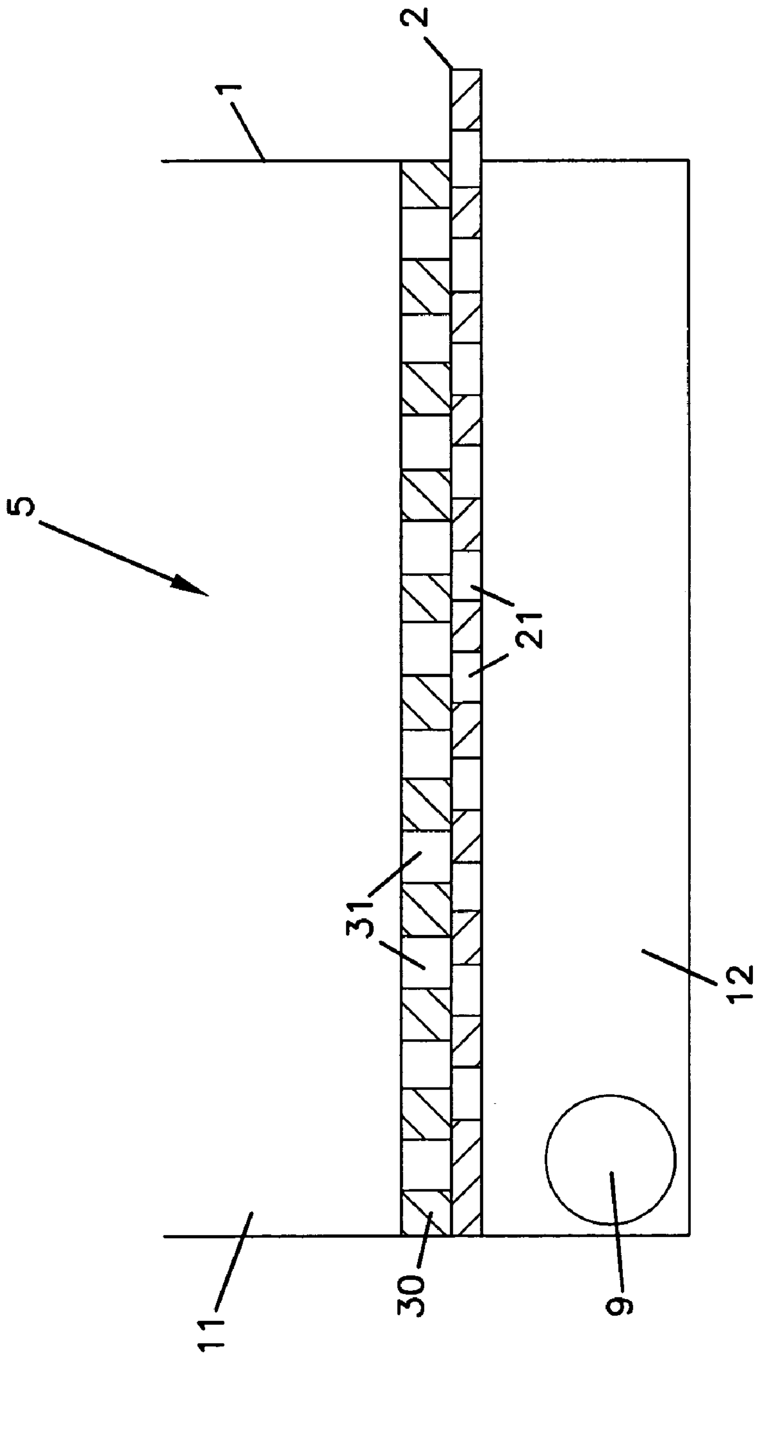
FIG. 1 is a side view of a pill counter according to the invention.

Corresponding reference numbers indicate corresponding parts throughout the several views and embodiments in the drawings. One embodiment of a pill counter according to the invention is shown in FIG. 1. The pill counter 5 includes a housing 1 having at least one chamber, a moveable plate 2 and one or more removable sizing guides 30. The housing 1 is divided into an upper section 11 and a lower section 12 by the moveable plate 2. The housing 1 is shown as having a rectangular or square shape. The housing 1 can be of any shape including a polygon, circle, ellipse, etc. The housing 1 has an opening 9 in the lower section 12 for dispensing the counted pills or capsules. The moveable plate 2 is moveable from a first position to a second position. The plate 2 can move laterally or it can pivot about a fixed point. The plate 2 is supported by grooves, rails, channels, ridges, or any other protrusions or recesses in walls of the housing 1.

The sizing guide 30 fits within the chamber and is substantially aligned with and vertically displaced from the movable plate 2. The sizing guide 30 and the moveable plate 2 have a plurality of apertures 31, 21, respectively. The apertures 31, 21 are sized to allow pills or capsules to pass through. The apertures 31 in the sizing guide 30 are arranged in a pattern that is the same as the pattern of apertures 21 in the plate 2. The pattern of apertures 31, 21 can be one of columns and rows, with the number of apertures 31, 21 in each column and/or row being a fraction of often-desired numbers of pills. For example, a pattern of 10 apertures 31, 21 in rows and 5 apertures 31, 21 in columns provides the ability of counting up to 50 pills or capsules in increments of 5.

The apertures 31 in the sizing guide 30 can be numbered with indices for easy reference. Alternatively, the walls of the housing 1 can be labeled with numbers corresponding to the total number of apertures in one column and counting across the columns of apertures 31 in the sizing guide 30. In the above example, the housing wall adjacent the first column of apertures 31 would be labeled "5", the next column would be labeled "10" and so on down up to "50" for the last column. In one embodiment, the sizing guide 30 is removably inserted into the upper section 11 of the housing 1 and rests on the plate 2, as shown in FIG. 1. In another embodiment, the removable sizing guide 30 can be supported by the grooves, rails, channels, ridges, or any other protrusions or recesses in walls of the housing 1, with the plate 2 resting on top of the sizing guide 30.

When the plate 2 is in the first position, the apertures 21 in the plate 2 and the apertures 31 in the sizing guide 30 are offset and out of register. When the plate 2 is moved into the second position, the apertures 21, 31 move into register. As used herein, "register" is intended to mean a condition of correct alignment or proper relative position. The range of movement of the plate 2 is dependent on the spacing between the apertures 31, 21 in the sizing guide 30 and plate 2. There is space between the apertures 21 in the plate 2 for pills that have settled into apertures 31 in the sizing guide 30 to rest on the plate 2 between apertures 21. Having the counted pills settle into the apertures 31 in the sizing guide 30 without immediately falling through to the lower section 12 of the housing 1 allows for any excess pills to be removed, and assures that only one pill goes through each set of apertures 31, 21 for accurate counting.

In one embodiment, the plate 2 extends beyond at least one wall of the housing 1, as shown in FIG. 1. The extended portion is used as a handle to move the plate 2 from the first position to the second position. The moveable plate 2 shown in FIG. 1 extends between opposite sides of the housing and protrudes from one end when in the first position. The moveable plate 2 need not extend all the way between sides of the housing 1. The combined surfaces of the sizing guide 30 and plate 2, when in the first position, extend across the housing such that pills or capsules placed into the upper section 11 of the housing 1 do not fall into the lower section 12.

In use, the apertures 31 corresponding to the desired number of pills or capsules are separated from the remaining apertures 31 using, for example, a divider, spatula, the user's hand, or any other tool. An excess of pills or capsules to be counted is placed into the upper section 11 of the housing 1. The pill counter 5 is tilted or shaken to allow the pills or capsules to settle into the apertures 31 in the sizing guide 30. Since the apertures 31, 21 in the sizing guide 30 and in the plate 2 are out of register; the pills or capsules do not pass through plate 2, but rest on plate 2. The excess pills or capsules are removed, and the plate 2 is moved into the second position, moving the apertures 31, 21 into register and allowing the counted pills to fall through to the lower section 12 of the housing 1. The pill counter 5 is then manipulated to dispense the counted pills through the opening 9 in the housing 1 into a bottle or other vessel. In an alternative embodiment, counted pills can be dispensed from a housing without an opening 9 by removing the sizing guide 30 and retracting the plate 2 to allow access to the lower section 12 of the housing 1.

Figure 8:
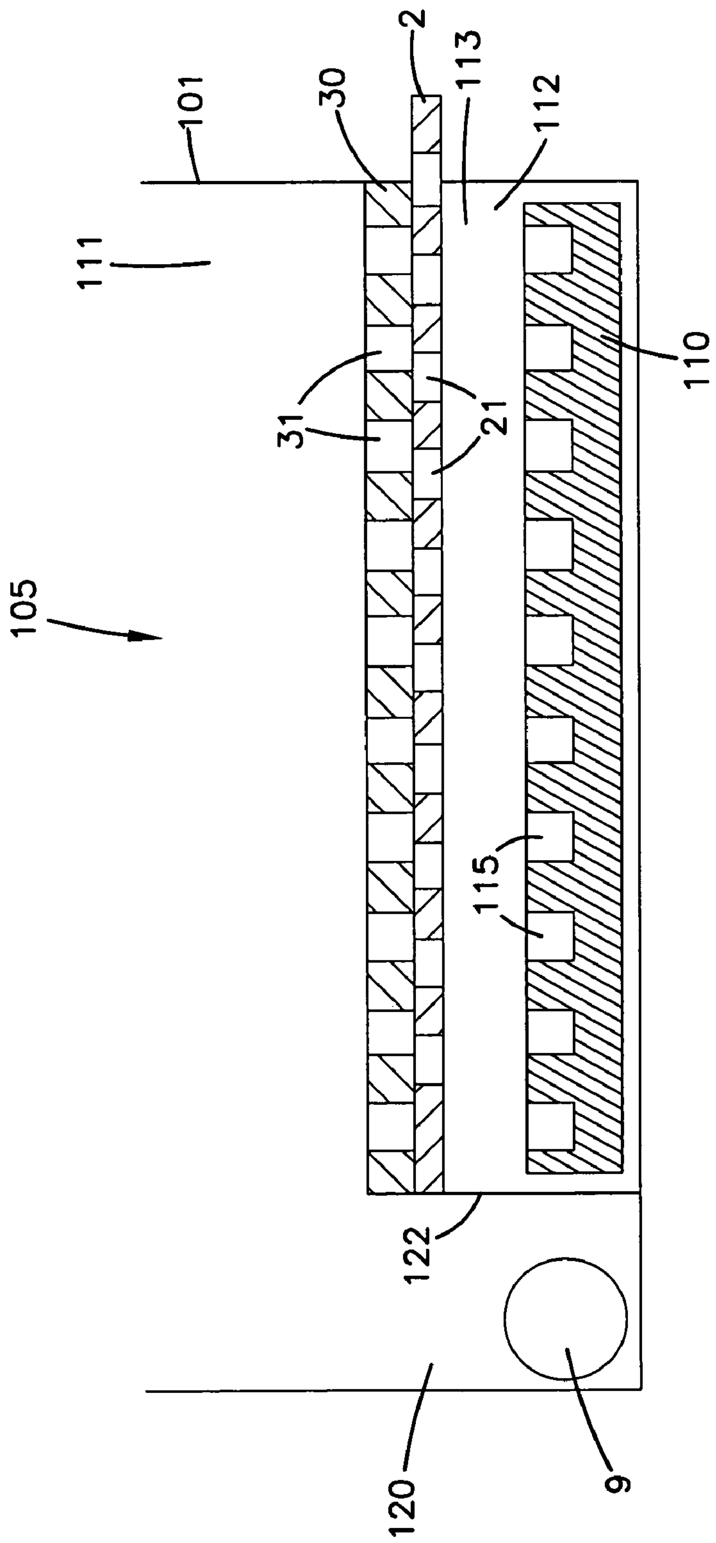
FIG. 8 is a side view of a further embodiment of a pill counter according to the invention.

In another embodiment, the counted pills can be dispensed into individual packaging such as blister packs. This embodiment of pill counter 105, shown in FIG. 8, includes a housing 101 divided into an upper section 111 and a lower section 112 by a moveable plate 2, one or more removable sizing guides 30, and a template 110 for holding a blister pack card. The template 110 has depressions 115 corresponding to the individual pill- or capsule-holding blisters in a blister card. The housing 101 has an end section 120 separated from the lower section 112 by a wall 122. The end section 120 has an opening 9 for returning the excess pills or capsules to a stock bottle. An opening 113 in one wall of the housing 101 allows for inserting and removing the template 110. Apertures 31, 21 in the sizing guide 30 and moveable plate 2, respectively, are arranged in a pattern that corresponds with the pattern of depressions 115 in the template 110. The template 110 is placed in the lower section 112 of the housing 101 such that the depressions 115 are aligned with the apertures 31 in the sizing guide 30.

In use, a template 110 holding a blister pack card is placed into the lower section 112 of the housing 101. The apertures 31 corresponding to the desired number of pills or capsules are separated from the remaining apertures 31 using, for example, a divider, spatula, the user's hand, or any other tool. An excess of pills or capsules to be counted is placed into the upper section 111 of the housing 101. The pill counter 105 is tilted or shaken to allow the pills or capsules to settle into the apertures 31 in the sizing guide 30. The excess pills or capsules are removed, for example, by sweeping them off the end of the sizing guide 31 into the end section 120 and out opening 9 into the stock bottle. Plate 2 is moved into the second position, moving the apertures 21 into register with apertures 31 and depressions 115, and allowing the counted pills to fall into the depressions 115 in the template 110 in the lower section 112 of the housing 101. The template 110 is removed and the blister pack card containing the pills is removed and sealed.

Figure 2:
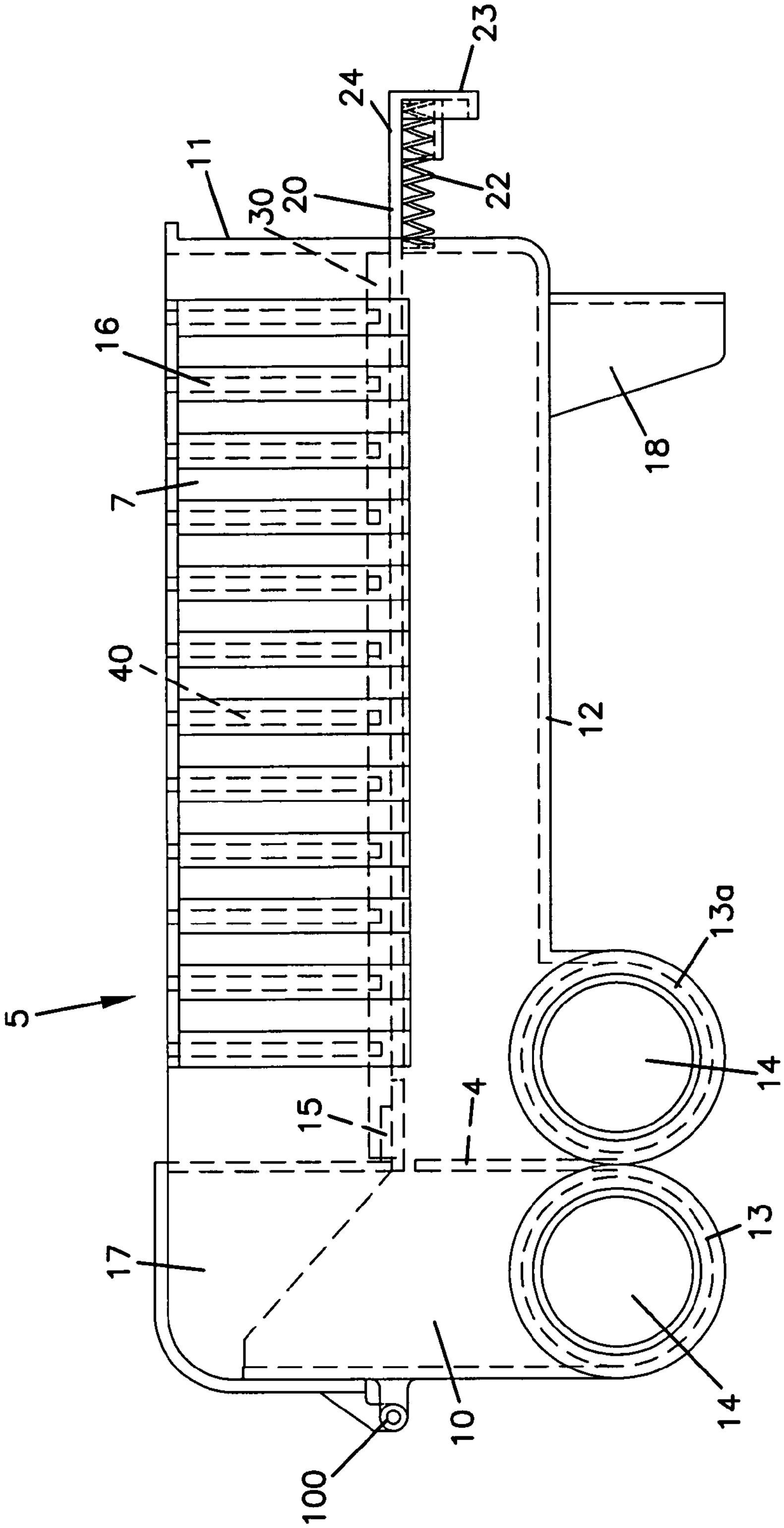
FIG. 2 is a side view of another embodiment of a pill counter according to the invention.

Another embodiment of the invention is shown in FIGS. 2–7. As shown in FIG. 2, the pill counter 5 includes a housing 10, a movable plate 20, a removable sizing guide 30 and a divider 40. The housing 10 has at least one chamber that is divided into an upper section 11 and a lower section 12 by the movable plate 20. In a further embodiment, the housing 10 can include one or more troughs 13, 13*a* for dispensing pills into either a stock bottle or a prescription bottle. The troughs 13, 13*a* can have openings 14 to facilitate dispensing pills into bottles. Alternatively, the lower section 12 of the housing 10 can have one or more openings for dispensing the pills.

When two troughs 13, 13*a* are present, they can be separated by a wall 4. Trough 13 serves to return excess pills to a stock bottle, and trough 13*a* allows for dispensing the counted pills into a prescription bottle or other container. In an alternate embodiment, wall 4 can separate regions of the lower section 12 of the housing 10. Each region would preferably have an opening for dispensing pills.

Figure 3:
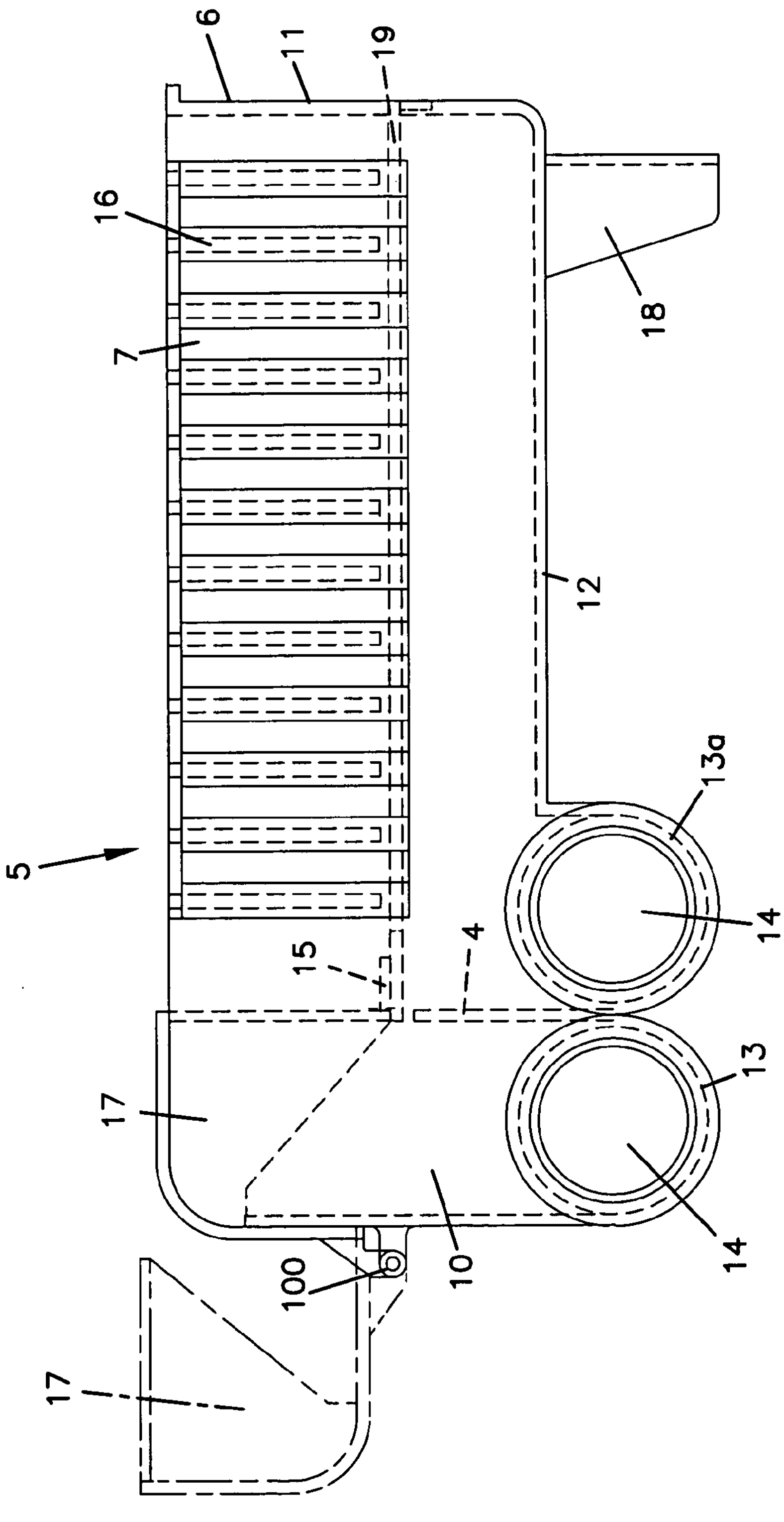
FIG. 3 is a side view of a housing according to the invention, showing a movable barrier in both the closed and open position.

In a still further embodiment, an optional movable barrier, such as the pivoting cover 17 shown in FIGS. 2 and 3, is positioned such that in a closed position (FIG. 2) it forms a wall between trough 13 and the upper section 11 of the housing. In one embodiment, the pivoting cover 17 moves between an open and a closed position via a hinge 100. In FIG. 3, the pivoting cover 17 is shown in the closed position (solid lines) and in the open position (dashed lines). The pivoting cover 17 is closed when pills or capsules are poured into the upper section 11 of the chamber for counting. The cover 17 prevents the pills or capsules from falling into the trough 13. Once the pills to be counted are in place in the sizing guide apertures 31, the pivoting cover 17 is opened and the excess pills or capsules can be transferred from the upper section 11 of the chamber to the trough 13 for return to a stock bottle. In another embodiment, a divider or other barrier can be used to prevent pills from falling into trough

13 when an excess of pills is poured into the upper section 11 of the housing for counting.

If present, the troughs 13, 13*a* can support one end of the housing. The housing can additionally have one or more legs 18 on the end opposite the troughs 13, 13*a*, as shown in FIG. 2. Alternatively, the troughs 13, 13*a* can be spaced apart to support the pill counter 5.

Housing side walls 7, 8 (FIG. 4), can have grooves, rails, channels, ridges or any other type of recesses or protrusions to support the movable plate 20. In the embodiment shown in FIG. 3, an opening 19 in one wall of the housing 10 receives the movable plate 20 (see FIG. 2). The opening 19 can be in any wall of the housing. Alternatively, the plate 20 may not extend beyond the outer walls of the housing 10. In such an embodiment, an additional structure extending beyond the housing walls could be attached to the plate 20 to move the plate 20 between first and second positions. In the embodiment of FIG. 2, when the plate 20 is inserted into the housing 10, the plate 20 can extend from the rear wall 6 of the housing to a short wall 4 separating the two troughs 13, 13*a*. Alternatively, the plate 20 could extend less than this distance, with the sizing guide 30 covering the remaining part of the lower section 12 of the housing. In order for the pills to be counted accurately, the combination of the removable sizing guide 30 and the plate 20, when in the first position, should cover the lower section 12 of the housing 10 to prevent pills from falling into the lower section 12 of the housing 10. In the embodiment shown in FIG. 2, wall 4 extends up between the troughs 13, 13*a* and ends beneath the movable plate 20, enclosing the lower section 12 of the housing.

Figure 4:
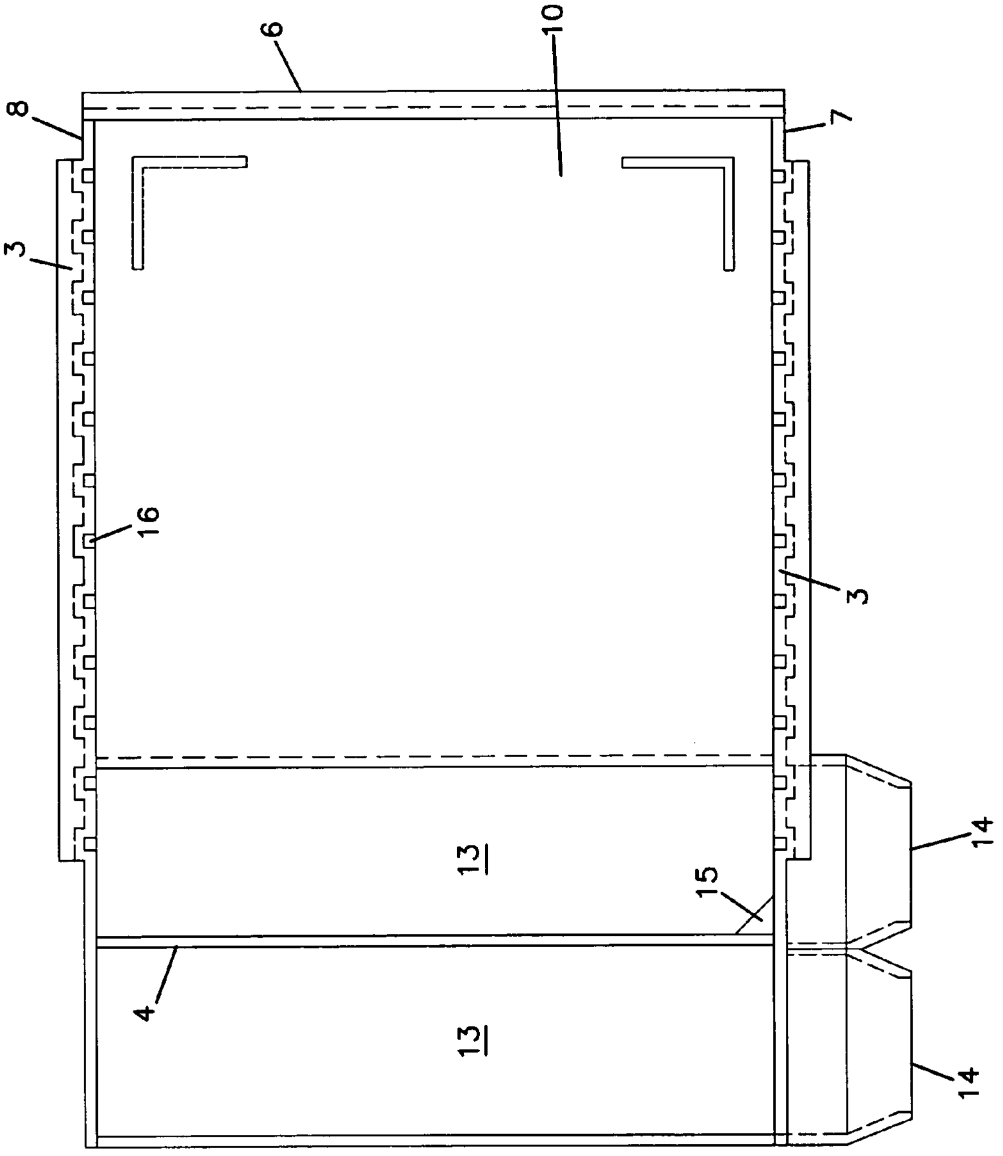
FIG. 4 is a top view of the housing of FIG. 3.

In the embodiment shown in FIG. 4, the housing 10 has slots 16 in the side walls 7, 8 for placement of a divider 40 to separate a section of the sizing guide corresponding to the desired number of pills or capsules to be counted. Alternatively, the user could hold a divider or other barrier in place. In one embodiment, the housing walls 7, 8 have flanges 3 at their upper edges. The flanges 3 can be labeled with the number of pills corresponding to each slot 16. The housing can have a marker 15 for aligning the sizing guides 30. In the embodiment shown in FIG. 4, the marker 15 is a triangular protrusion positioned above the recesses for the movable plate 20. The marker 15 matches a notched corner 32 on the sizing guides 30 for correct placement of the sizing guides in the housing.

The movable plate 20 has apertures 21 sized to allow the counted pills or capsules to fall through into the lower section 12 of the housing 10. In one embodiment, the apertures 21 are at least as large as the largest size of pills and/or the diameter of the largest capsules that would be counted using the device. See FIG. 5. In another embodiment, multiple movable plates 20 could be provided, each with a different size of apertures 21 corresponding to a particular sized pill and/or capsule. In one embodiment, the apertures 21 are arranged in offset rows and columns to maximize the number of apertures 21 for the size of the plate. The number of apertures 21 in each column corresponds with a number of pills often desired, such as 5 or 10. With this type of arrangement, pills or capsules in multiples of 5 or 10 can easily and rapidly be counted and dispensed.

In one embodiment, the movable plate 20 has a region 24 that extends beyond the housing 10 when the plate 20 is inserted into the housing 10. Alternatively, the entire length or width of the plate could extend beyond the housing. In a still further embodiment, the plate 20 can be sized to fit within the walls of the housing, and a separate and/or attachable mechanism can be used to move the plate between first and second positions. In the embodiment illustrated in FIGS. 2 and 5, the extended region 24 has a flange 23 for moving the plate 20 from a first position to a second, inserted position.

Figure 5:
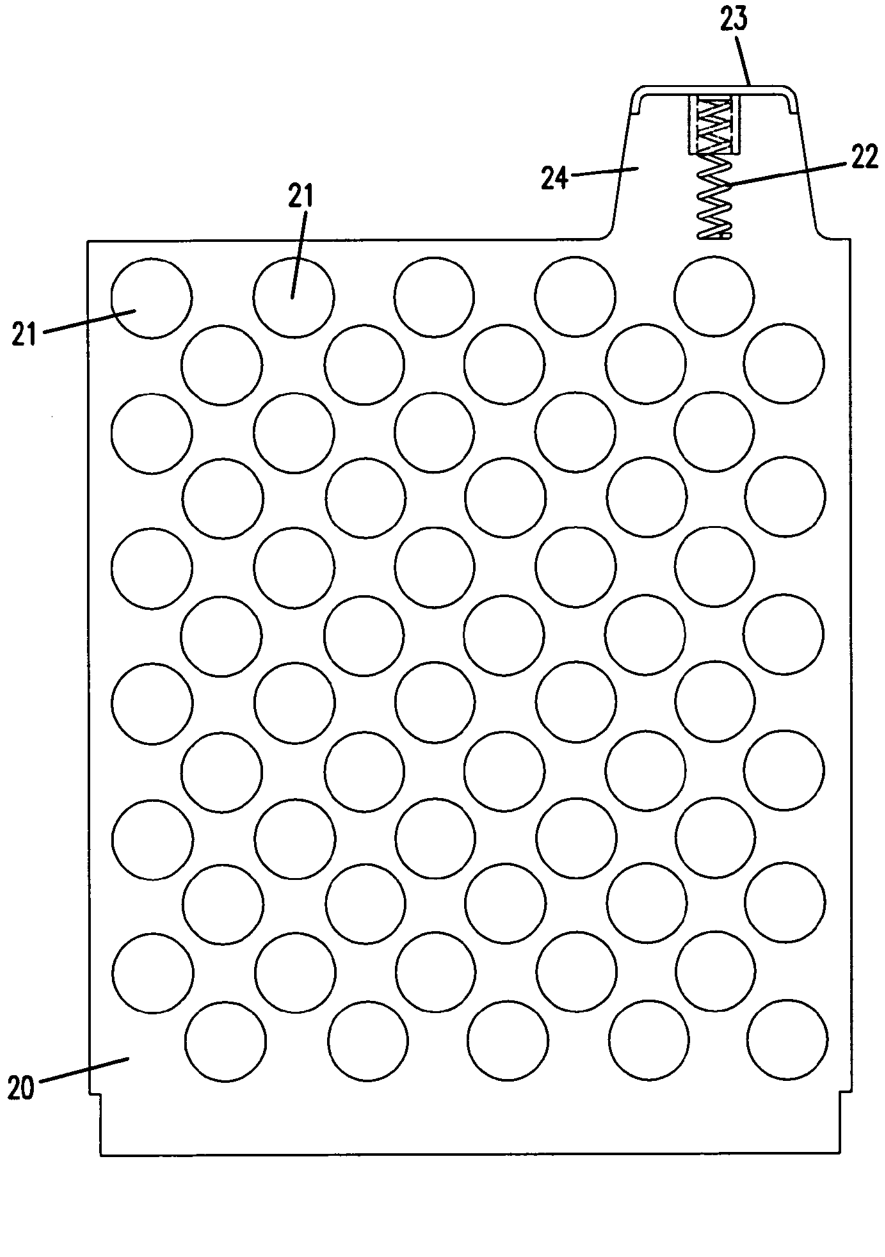
FIG. 5 is a bottom view of a movable plate according to the invention.

The plate 20 can be moved from the first position to the second position manually. Alternatively, a spring 22 attached to the flange 23, as shown in FIGS. 2 and 5, can be used to automatically return the plate 20 to the first position after manually moving the plate into the second position. The spring 22 rests against the rear wall 6 of the housing when the plate is in the first position. When pressure is exerted on the flange 23 of the plate 20, the spring 22 compresses, causing the plate 20 to be inserted into the housing, moving the plate into the second position. When pressure is released, the spring 22 releases, allowing the plate 20 to return to the first position.

Figure 6:
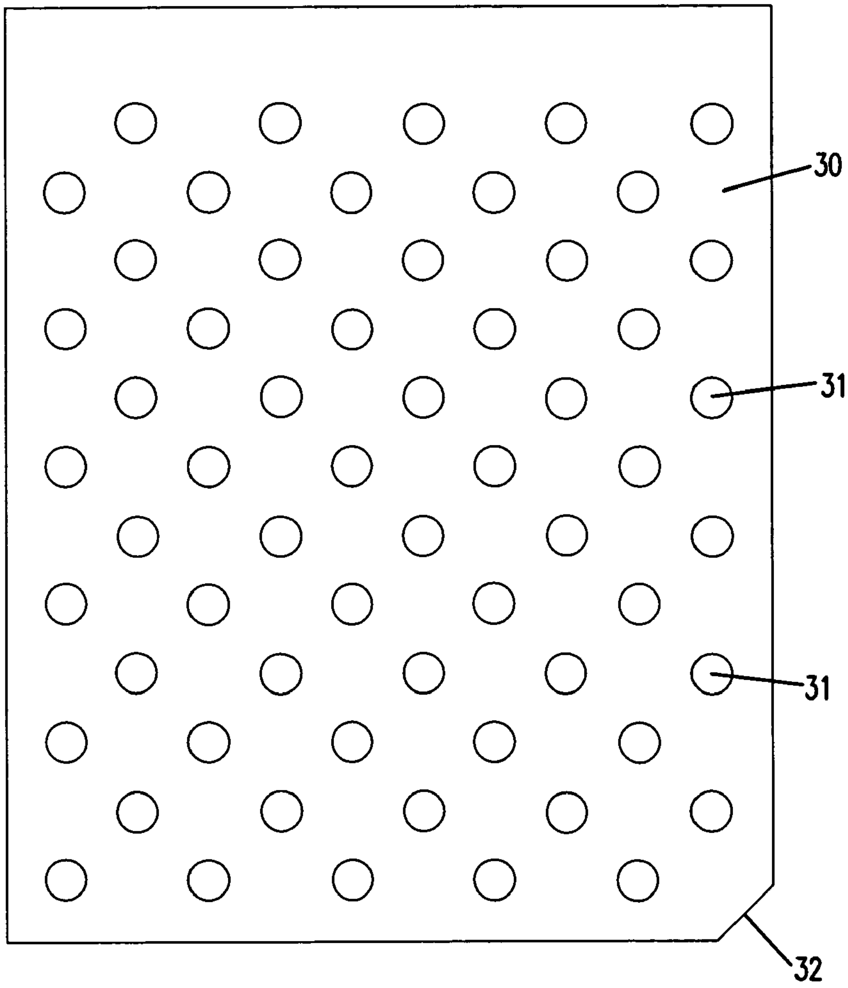
FIG. 6 is a top view of a sizing guide according to the invention.
Figure 7:
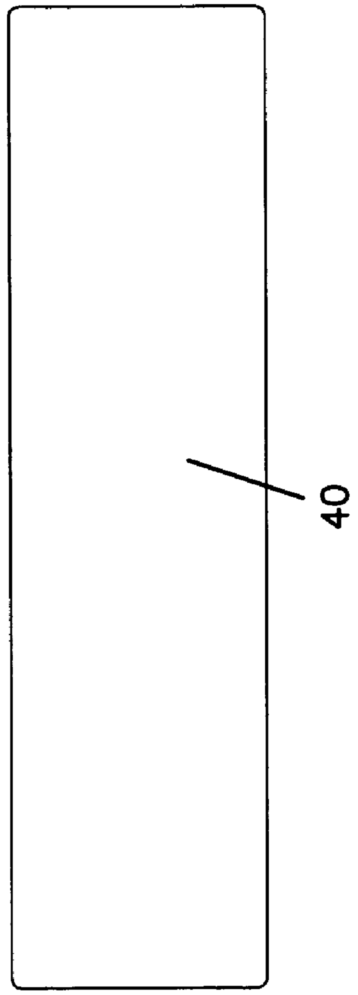
FIG. 7 is a side view of a divider according to the invention.

One embodiment of a removable sizing guide 30 is shown in FIG. 6. The sizing guide 30 has a plurality of apertures 31 that correspond to a particular pill size. The apertures 31 in the sizing guide 30 are in the same pattern as the apertures 21 in the movable plate 20. If the pattern of apertures 31 is not symmetrical and centrally aligned on the guide 30 such that the pattern remains the same regardless of the orientation of the guide 30, a mark on the guide 30 can assist in proper placement of the sizing guide 30 to assure alignment of the apertures 31 with the plate apertures 21. Depending on the type of mark, a corresponding mark can be located on the housing 10 or moveable plate 20. In the embodiment shown in FIG. 6, the sizing guide 30 is marked by a notched corner 32 that corresponds to a marker 15 on the housing (see FIG. 4). When the sizing guide 30 is placed over the movable plate 20 in the housing 10 with the notched corner 32 matched to the marker 15, and the plate 20 is moved into the second position, the apertures 31, 21 are in register.

Sizing guides 30 for various sizes of pills or capsules can be provided with the pill counter. The sizing guide 30 illustrated in FIG. 6 is designed for small pills. A sizing guide 30 with slightly larger apertures 31 would be suitable for medium pills. A sizing guide 30 with apertures 31 the same size as the apertures 21 in the movable plate 20 would be suitable for large pills. The thickness of the sizing guide 30 and the dimensions of the apertures 31 are large enough to retain the pills or capsules to be counted, but small enough to exclude two pills or capsules in each aperture 31. The thickness of a sizing guide 30 will generally be such that multiple pills, sitting one on top of another, cannot fit within the apertures 31. Thus, the thickness of a sizing guide 30 for small pills can be thinner than the thickness of a sizing guide 30 for large pills. Similarly, the apertures 31 should have a diameter less than twice the diameter of the pills being counted to prevent two pills fitting within the apertures 31 in side-by-side orientation.

Sizing guides 30 designed for capsules can have a thickness such that the capsules fit on end into the apertures without falling over. This allows a single movable plate 20 to be used for both pills and capsules. For example, the thickness of the capsule sizing guides 30 is at least about half the length of the capsules. The thickness of the capsule sizing guides 30 can be equal to the length of the capsules. Alternatively, a sizing guide 30 for capsules can have apertures 31 sized to allow the capsules to pass through on their sides. The apertures 31 can be circular, oval, or any other shape that accommodates the pills and/or capsules. The apertures 21, 31 can be arranged in multiples of commonly desired numbers of pills, such as five, seven, ten, etc. For example, in the embodiment shown in FIGS. 5 and 6, the sizing guide 30 and movable plate 20 have apertures 31, 21 in rows of six and columns of five.

The slots 16 in the housing 10 are positioned after each column of apertures 31 on the sizing guide 30. To count 30 pills, a divider 40 is inserted into the sixth set of slots 16, as shown in FIG. 2. The slots 16 may be marked with the number 30 for easy reference. This separates six columns of five apertures 31 from the rest of the sizing guide. The divider 40, shown in FIG. 7, can be a thin piece of plastic or other suitable material that fits into the slots 16 in the housing and extends upwards from the sizing guide 30. More than one height of divider can be provided with the housing. A taller divider 40 can be used with thinner sizing guides 30 for counting pills, while a shorter divider 40 can be used with thicker sizing guides 30 for counting capsules. The divider 40 only need be as tall as the side walls 7, 8 of the housing.

The pill and capsule counter shown in FIGS. 2–7 is used as follows. The movable plate 20 is inserted into the housing to the first position. A sizing guide 30 is selected based on the size of pill or capsule to be counted. The sizing guide 30 is inserted into the housing, matching the notched corner 32 of the guide 30 with the marker 15 on the housing 10 such that the guide 30 fits within the housing chamber and is substantially aligned with and vertically displaced from the movable plate 20. A divider 40 is inserted into the slots 16 corresponding to the number of pills or capsules to be counted. The pivoting cover 17 is closed and an excess of pills or capsules to be counted are placed into the upper section 11 between the pivoting cover 17 and the divider 40. The pill counter is tilted, rocked or shaken to distribute the pills or capsules into the apertures 31 in the sizing guide 30. The pivoting cover 17 is opened and the excess pills or capsules are brushed or shaken into the trough 13, leaving the desired number of pills or capsules in the apertures 31. The excess pills or capsules can be returned to the stock bottle by tipping the pill counter such that the excess pills or capsules exit the trough 13 through the opening 14. The pivoting cover 17 is closed and the flange 23 on the movable plate 20 is pressed, causing the plate 20 to move to the second, inserted position. As the plate moves inward, the apertures 21 move into register with the apertures 31 in the sizing guide 30 causing the pills or capsules to drop into the lower section 12 of the housing. The pill counter is tilted to move the pills or capsules into the trough **13*a*** for dispensing the counted pills or capsules into a prescription bottle or other vessel.

Figure 9:
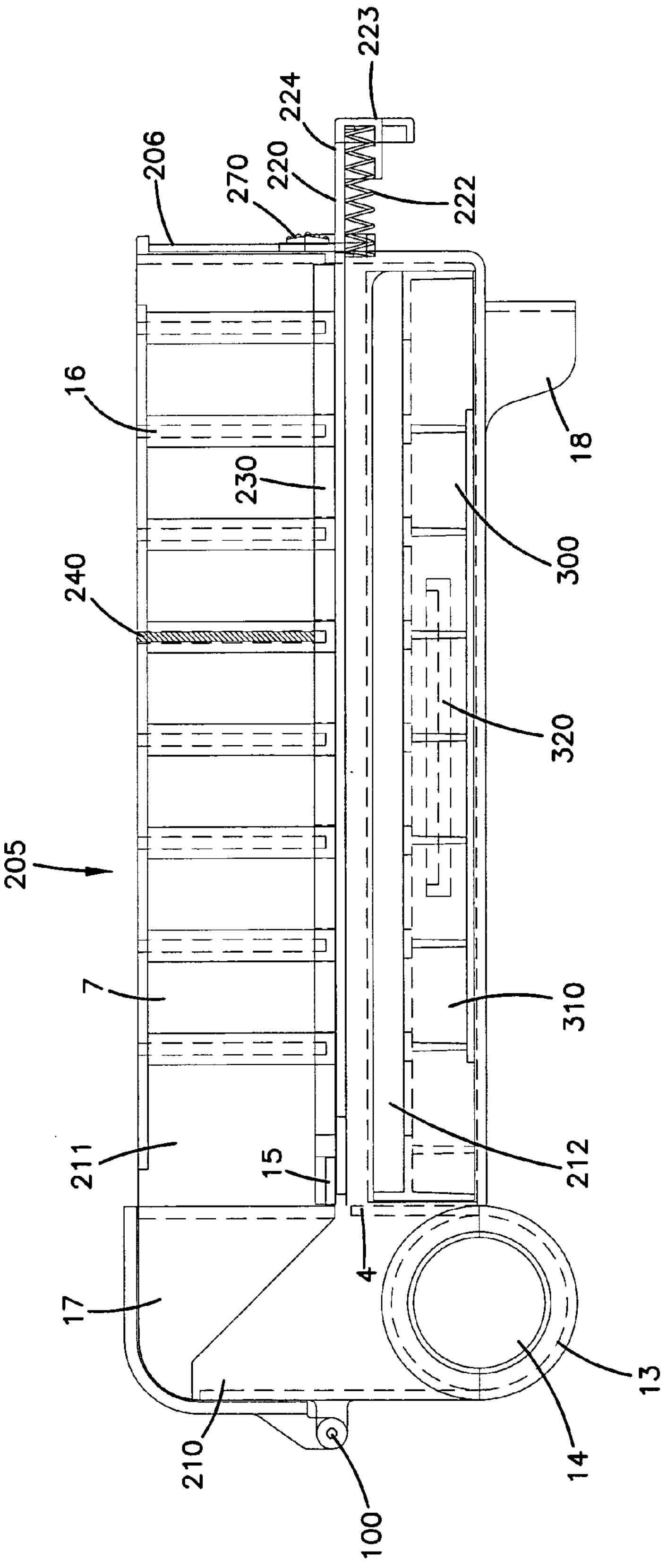
FIG. 9 is a side view of another embodiment of a pill counter with a moveable plate, template, sizing guide and divider in place.

Another embodiment of the invention, for dispensing counted pills or capsules into an individual packaging article, is shown in FIGS. 9–29. This embodiment has features in common with the embodiment shown in FIGS. 2–7. The features common to both embodiments are numbered the same. As shown in FIG. 9, the pill counter 205 includes a housing 210, a movable plate 220, a removable sizing guide 230, and a template 300 for holding an individual packaging article, such as a blister pack card. The pill counter 205 is shown in FIG. 9 with an optional column divider 240. The housing 210 has at least one chamber that is divided into an upper section 211 and a lower section 212 by the movable plate 220. In a further embodiment, the housing 210 includes a trough 13 with an opening 14 to facilitate returning excess pills to a stock bottle. The trough 13 is separated from the lower section 212 of the housing 210 by a wall 4.

The template 300 is sized to fit into lower section 212 of the housing 210, and to receive an individual packaging article such as a blister pack card. The housing 210 has an opening in one wall for insertion of the template 300. In one embodiment, the wall 8 opposite the trough opening 14 is open across the entire lower section 112. Template 300 has depressions 310 sized and arranged to receive the individual blisters and pills or capsules to be received therein. See FIGS. 17 and 18. The depressions 310 are arranged in the same pattern as apertures 231 in the sizing guides 230. A handle 320 on one side of template 300 facilitates insertion and removal. More than one template 300 may be included with the pill counter 205. Templates 300 with varying numbers and sizes of depressions 310 may be included to allow for dispensing pills or capsules into different sizes of blister pack cards.

In a still further embodiment, the pill counter 205 includes an optional movable barrier such as the pivoting cover 17 shown in FIGS. 2 and 3. In another embodiment, a divider or other barrier can be used to prevent pills from falling into trough 13 when an excess of pills is poured into the upper section 211 of the housing 210 for counting.

The trough 13 supports one end of the housing. The housing can additionally have one or more legs 18 on the end opposite the trough 13, as shown in FIG. 9. Housing side walls 7, 8, can have grooves, rails, channels, ridges or any other type of recesses, openings or protrusions to support the movable plate 220. Alternatively, the plate 220 may not extend beyond the outer walls of the housing. In such an embodiment, an additional structure extending beyond the housing walls may be attached to the plate to move the plate between first and second positions. In the embodiment of FIG. 9, when the plate 220 is inserted into the housing 210, the plate 220 extends from the rear wall 206 of the housing to the short wall 4 separating the trough 13 from the lower section 212 of the housing 210. Alternatively, the plate 220 may extend less than this distance, with the sizing guide 230 covering the remaining part of the lower section 212 of the housing. In order for the pills to be counted accurately, the combination of the removable sizing guide 230 and the plate 220, when in the first position, covers the lower section 212 of the housing 210 to prevent pills from falling into the lower section 212 of the housing 210. In the embodiment shown in FIG. 9, wall 4 extends upwards adjacent the trough 13 and ends beneath the movable plate 220, enclosing the lower section 212 of the housing.

Figure 10:
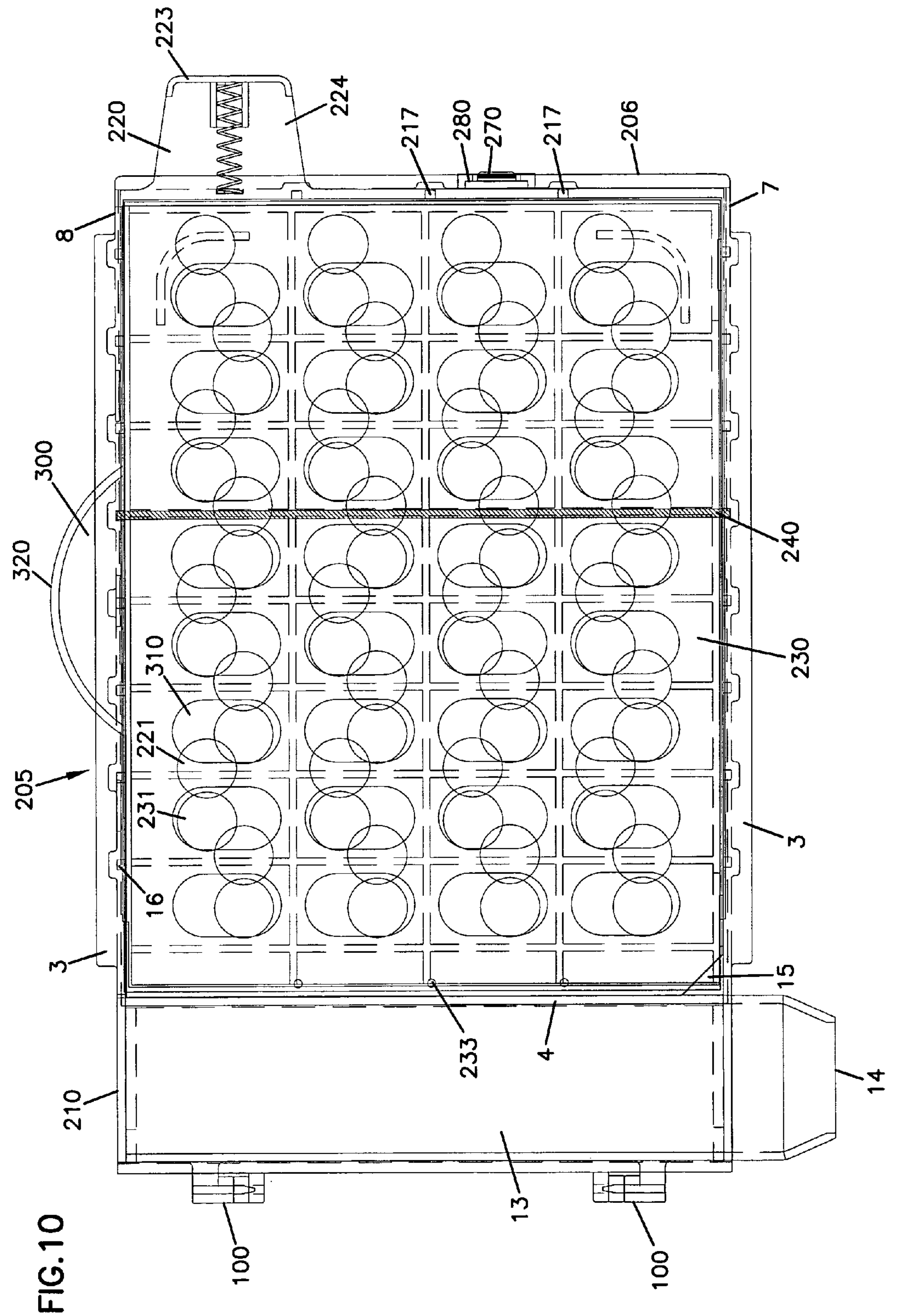
FIG. 10 is a top view of the pill counter of FIG. 9.

In the embodiment shown in FIGS. 9 and 10, the housing 210 has slots 16 in the side walls 7, 8 for receiving a column divider 240. The rear wall 206 has slots 217 for receiving a row divider 250. Any combination of column divider 240 and/or row divider 250 is used to separate a section of the sizing guide 230 corresponding to the desired number of pills or capsules to be counted. Column divider 240 and row divider are shown in FIGS. 19–23. If the desired number of pills or capsules to be counted is such that the proper number of apertures 231 in the sizing guide 230 cannot be separated using a combination of column dividers 240 and row dividers 250, one or more blocking bars 260, 265 can be used. See FIGS. 24–27. Blocking bars 260, 265 are provided in sizes corresponding to one or more apertures 231 in the sizing guide 230. Alternatively, the user could hold a divider or other barrier in place.

In one embodiment, the housing walls 7, 8 have flanges 3 at their upper edges. The flanges 3 can be labeled with the number of pills corresponding to each slot 16. In one embodiment, the housing 210 has a marker 15 for aligning the sizing guide 230. In the embodiment shown in FIG. 10, the marker 15 is a triangular protrusion positioned above the recesses for the movable plate 220. The marker 15 matches a notched corner 232 on the sizing guides 230 for correct placement of the sizing guides in the housing.

Figure 11:
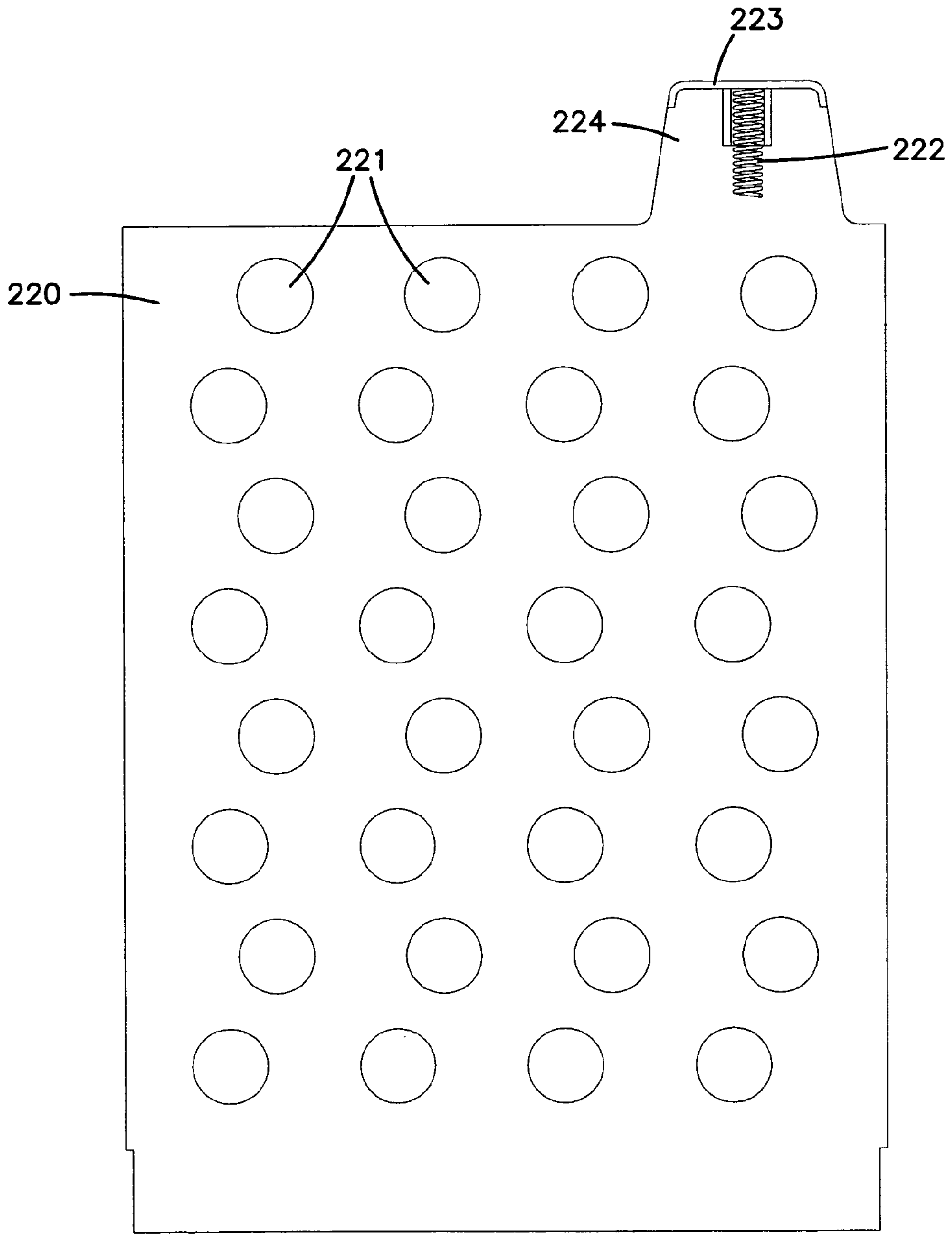
FIG. 11 is a bottom view of another movable plate according to the invention.
Figure 12:
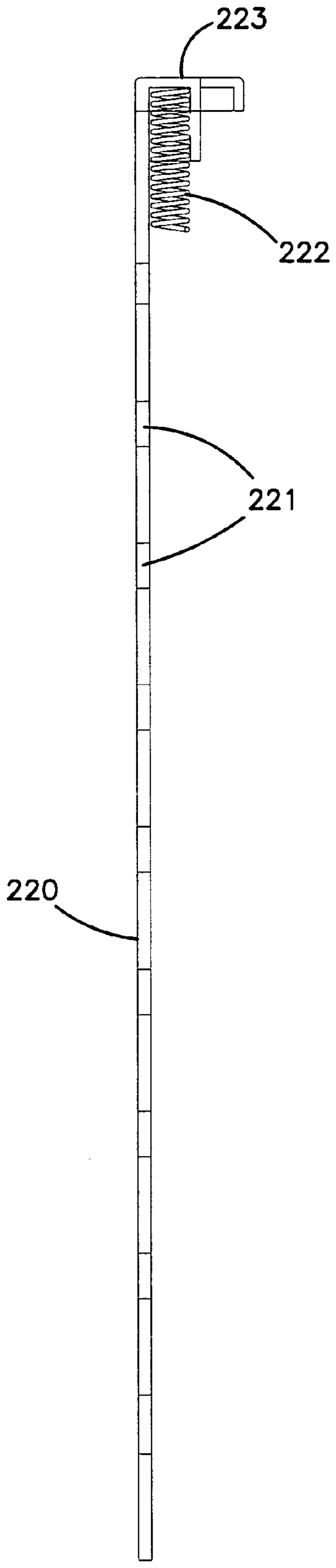
FIG. 12 is a side view of the movable plate of FIG. 11.
Figure 29:
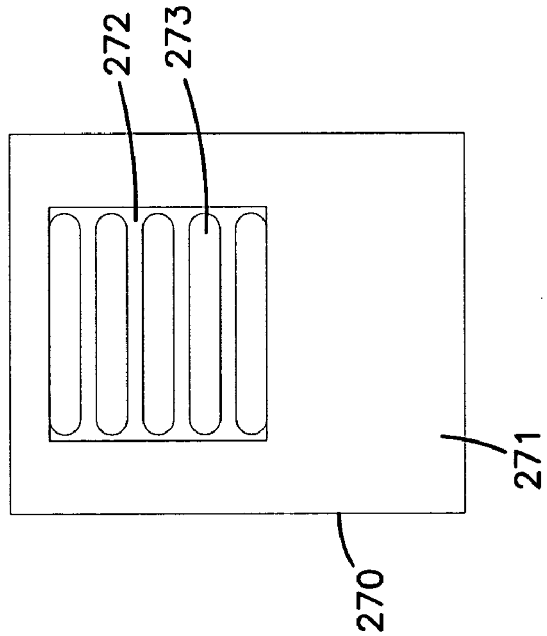
FIG. 29 is a front view of the plate lock of FIG. 28.
Figure 28:
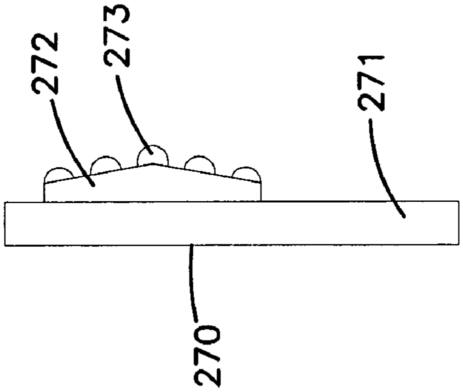
FIG. 28 is a side view of a plate lock according to the invention.

The movable plate 220, shown in FIGS. 11 and 12, has apertures 221, an extended region 224 with a flange 223 and spring 222 similar to the movable plate shown in FIGS. 2–7, but with a different aperture configuration. In one embodiment of the invention, the rear wall 206 of the housing 210 has a slot 280 for receiving a plate lock 270. See FIG. 10. The slot 280 is generally located at a distance from the location of the extended region 224 of the movable plate 220 when inserted into the housing 210. The plate lock 270, shown in detail in FIGS. 28 and 29, has a main body 271 and handle 272. After the movable plate 220 is inserted into the housing 210, the plate lock 270 is inserted into the slot 280 in the housing 210 such that the main body 271 extends downward past the plate 220, thereby preventing the plate 220 from being easily removed or falling out of the housing when the pill counter 205 is shaken. In the embodiment of FIGS. 28 and 29, the handle 272 of the plate lock 270 has ridges 273 to facilitate removal of the lock.

Figure 13:
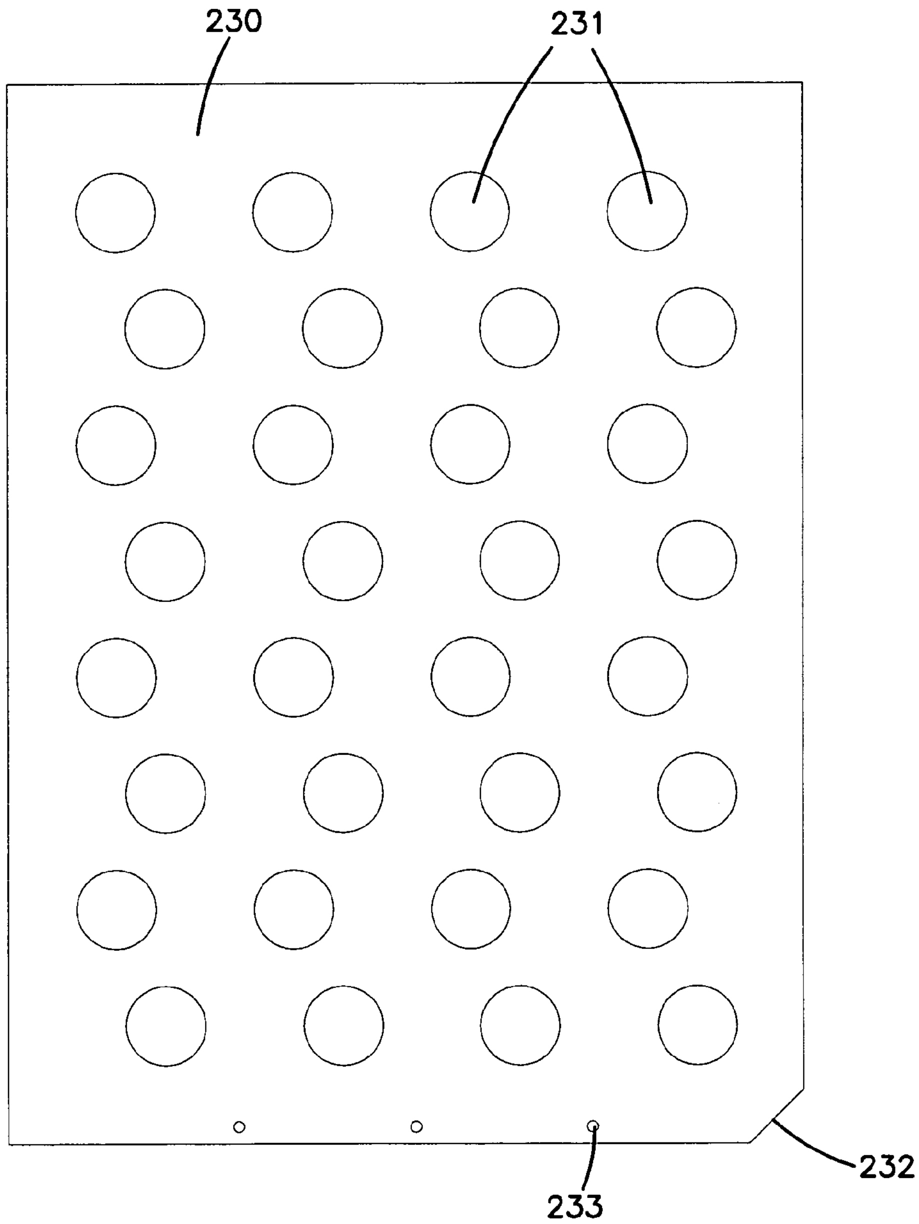
FIG. 13 is a top view of another sizing guide according to the invention.
Figure 14:
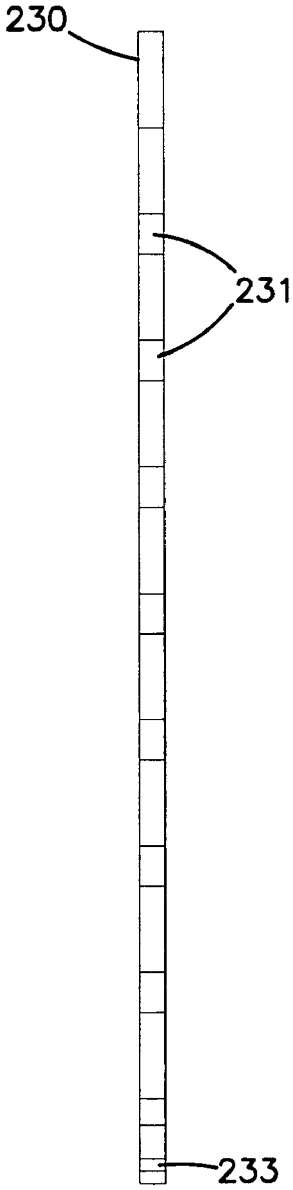
FIG. 14 is a side view of the sizing guide of FIG. 13.

One embodiment of a removable sizing guide 230 is shown in FIGS. 13 and 14. The sizing guide 230 has a plurality of apertures 231 that correspond to a particular pill size. The apertures 231 in the sizing guide 230 are in the same pattern as the apertures 221 in the movable plate 220 and the depressions 310 in the template 300. If the pattern of apertures 231 is not symmetrical and centrally aligned on the guide 230 such that the pattern remains the same regardless of the orientation of the guide 230, an indicator on the guide 230 can assist in proper placement of the sizing guide 230 to assure alignment of the apertures 231 with the plate apertures 221. Depending on the type of indicator, a corresponding indicator can be located on the housing 210 or moveable plate 220. In the embodiment shown in FIG. 13, the sizing guide 230 is marked by a notched corner 232 that corresponds to a marker 15 on the housing (see FIG. 10). In one embodiment, sizing guide 230 has depressions or holes 233 at one end. Holes 233 are positioned such that they are aligned with slots 217 in the rear wall 206 of the housing 210 when the sizing guide 230 is in place. The holes 233 receive pins 252 on row dividers 250.

Sizing guides 230 for various sizes of pills or capsules can be provided with the pill counter. The sizing guide 230 illustrated in FIG. 13 is designed for extra large tablets. Sizing guides 230 with smaller apertures 231 would be suitable for small and medium sized pills. The thickness of the sizing guide 230 and the dimensions of the apertures 231 are large enough to retain the pills or capsules to be counted, but small enough to exclude two pills or capsules in each aperture 231. The thickness of a sizing guide 230 will generally be such that multiple pills, sitting one on top of another, cannot fit within the apertures 231. Thus, the thickness of a sizing guide 230 for small pills may be thinner than the thickness of a sizing guide 230 for large pills. Similarly, the apertures 231 should have a diameter less than twice the diameter of the pills being counted to prevent two pills fitting within the apertures 231 in side-by-side orientation.

Figure 15:
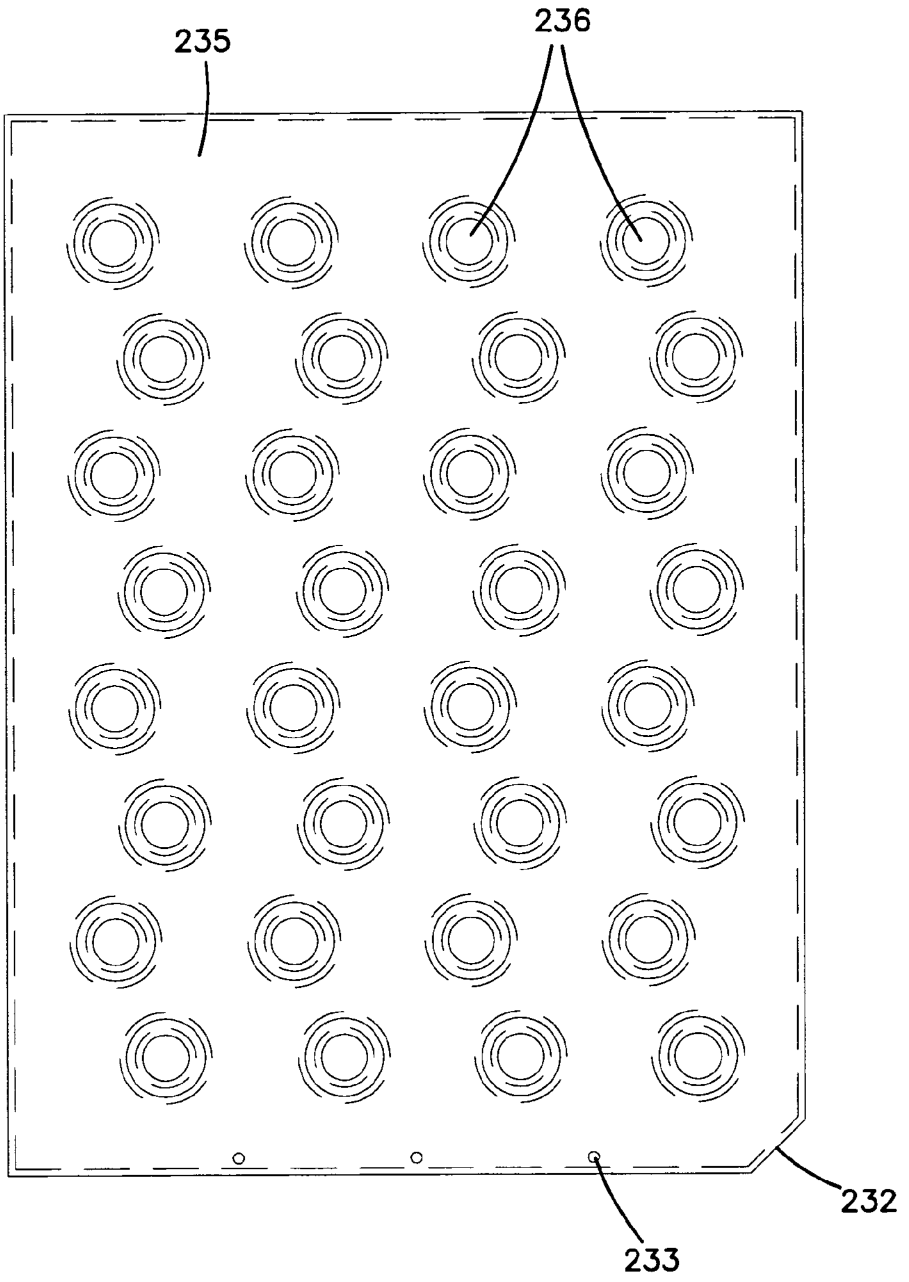
FIG. 15 is a top view of a capsule sizing guide according to the invention.
Figure 16:
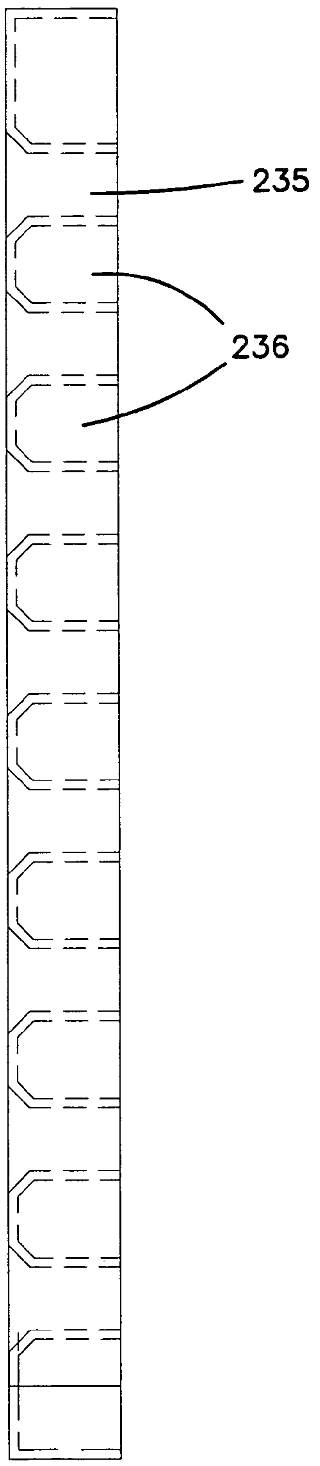
FIG. 16 is a side view of the capsule sizing guide of FIG. 15.
Figure 17:
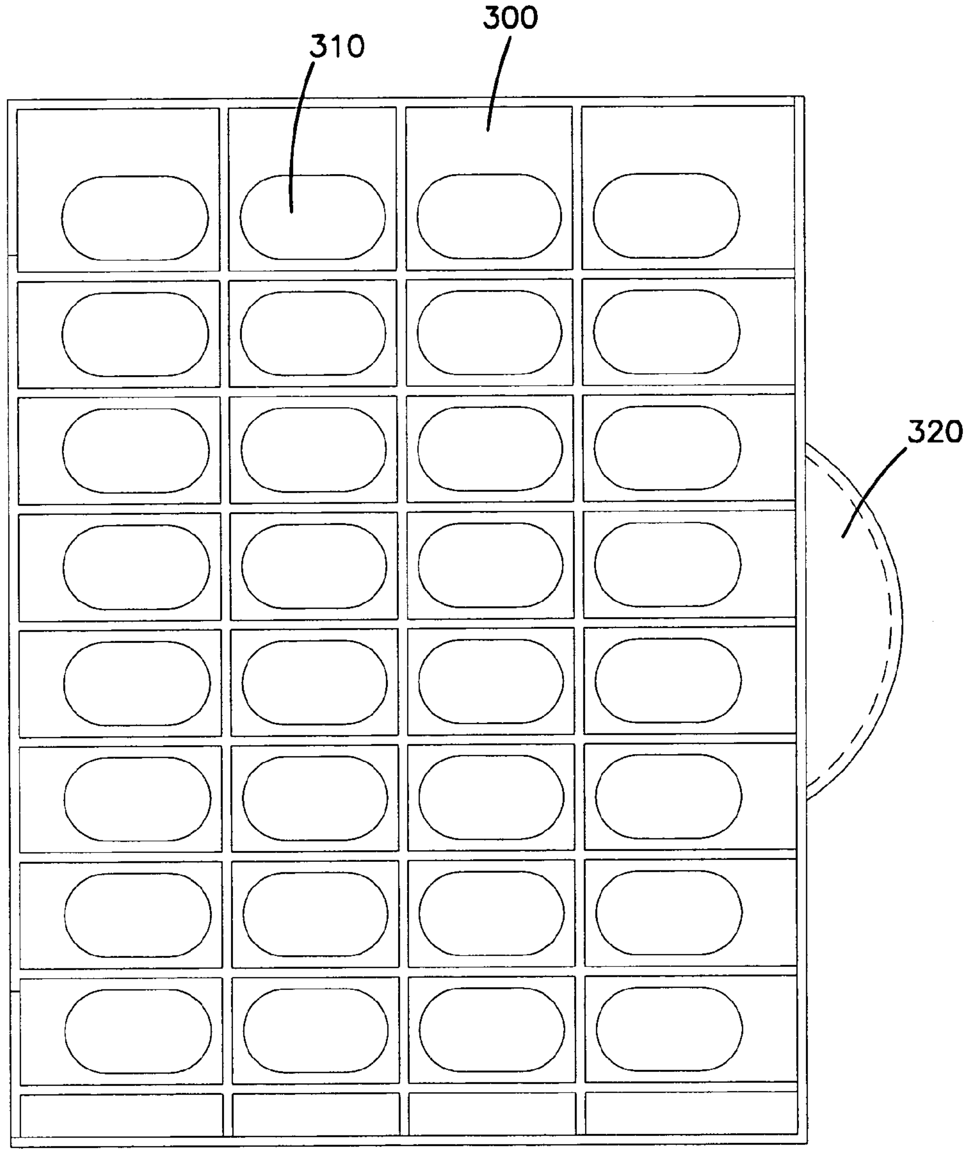
FIG. 17 is a top view of a template according to the invention.
Figure 18:
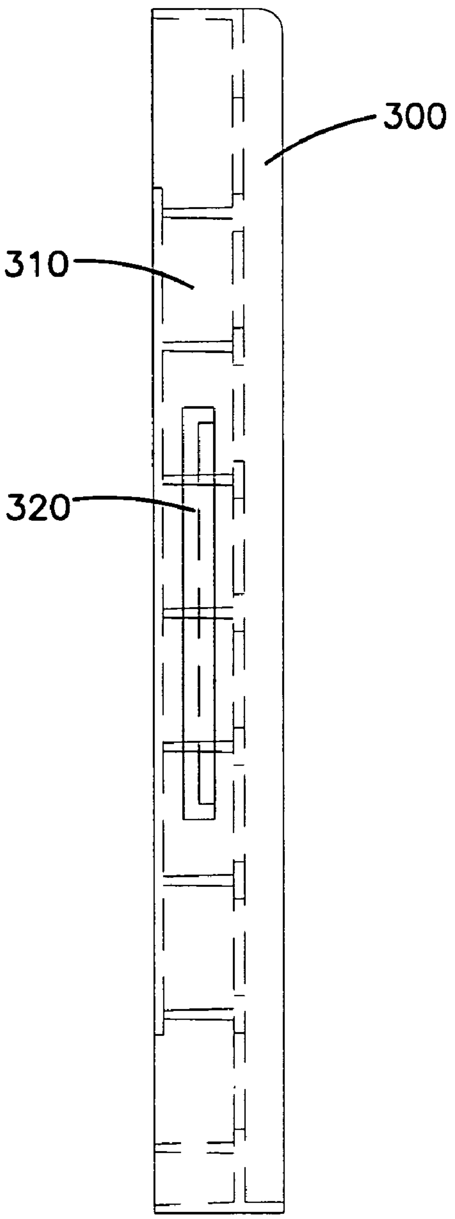
FIG. 18 is a side view of the template of FIG. 17.
Figure 21:
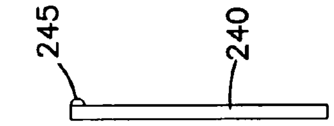
FIG. 21 is a end view of the column divider of FIG. 19.
Figure 19:
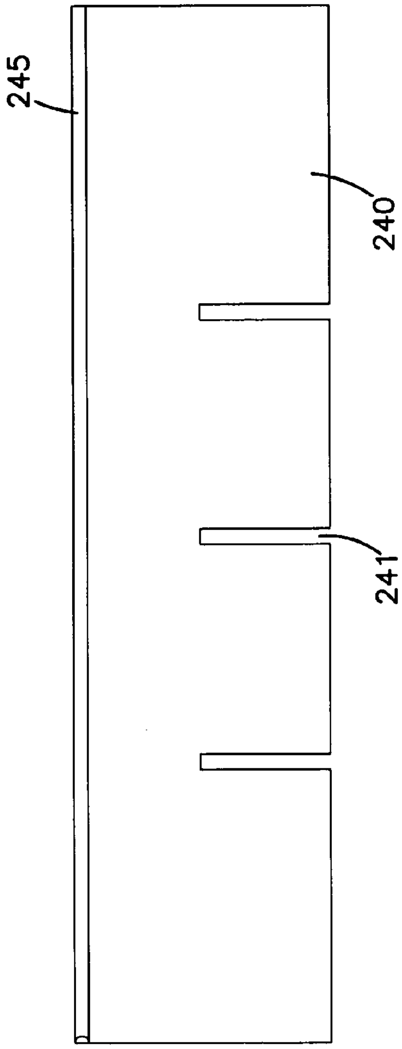
FIG. 19 is a side view of a column divider according to the invention.
Figure 20:
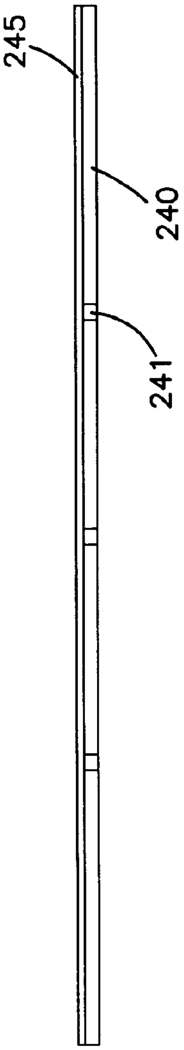
FIG. 20 is a top view of the column divider of FIG. 19.

Another embodiment of sizing guide 235 is shown in FIGS. 15 and 16. This embodiment is sizing guide 235 is designed for capsules and has a thickness such that the capsules fit on end into the apertures 236 without falling over. This allows a single movable plate 220 to be used for both pills and capsules. For example, the thickness of the capsule sizing guides 235 is at least about half the length of the capsules. The thickness of the capsule sizing guides 235 may be equal to the length of the capsules. Alternatively, a sizing guide for capsules may have apertures sized to allow the capsules to pass through on their sides. The apertures 236 can be circular, oval, or any other shape that accommodates the pills and/or capsules to be counted.

The apertures 221, 231 in the movable plate 220 and sizing guide 230, 235 are arranged in multiples of commonly desired numbers of pills, such as four, five, ten, etc. For example, in the embodiment shown in FIGS. 11–13, the sizing guide 230 and movable plate 220 have apertures 231, 221 arranged in four rows of eight apertures and eight columns of four apertures. The slots 16 in the housing 210 are positioned after each column of apertures 231 on the sizing guide 230. To count 20 pills, a column divider 240 is inserted into the set of slots 16 after the first five columns of apertures on the sizing guide 230. The five columns and four rows provide space for the desired 20 pills. The apertures 231 are counted from the end of the sizing guide 230 with the marker 232 because this end will be placed proximate the trough 13. The slots 16 may be marked with the number 20 for easy reference.

The column divider 240 can be a thin piece of plastic or other suitable material that fits into the slots 16 in the housing walls 7, 8, and extends upwards from the sizing guide 230. More than one height of column divider 240 can be provided with the pill counter 205. A taller column divider 240 may be used with thinner sizing guides 230 for counting pills, while a shorter column divider 240 may be used with thicker sizing guides 235 for counting capsules. The column divider 240 only need be tall enough to prevent excess pills or capsules from tumbling over it as the pill counter is shaken and tilted. For example, the column divider 240 may be as tall as the side walls 7, 8 of the housing 210. The column divider 240 shown in FIGS. 19–21 has openings 241 extending upwards from the bottom edge, and a protrusion 245 extending along the length of the top edge. The column divider 240 may be used with a row divider 250 and blocking bar 260 to separate a region on the sizing guide 230 corresponding to the desired number of pills or capsules to be counted.

Figure 22:
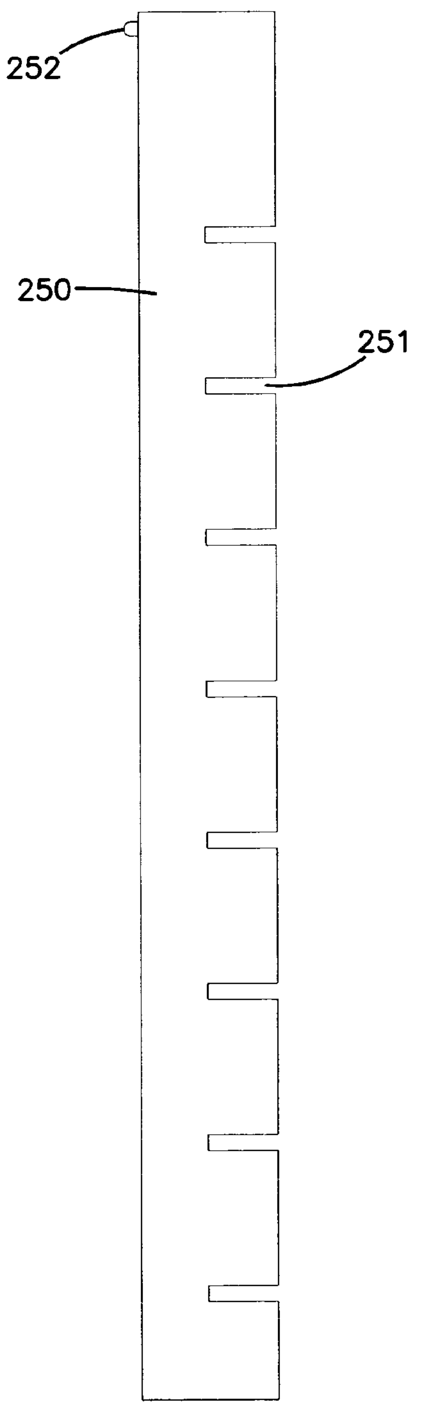
FIG. 22 is a side view of a row divider according to the invention.
Figure 23:
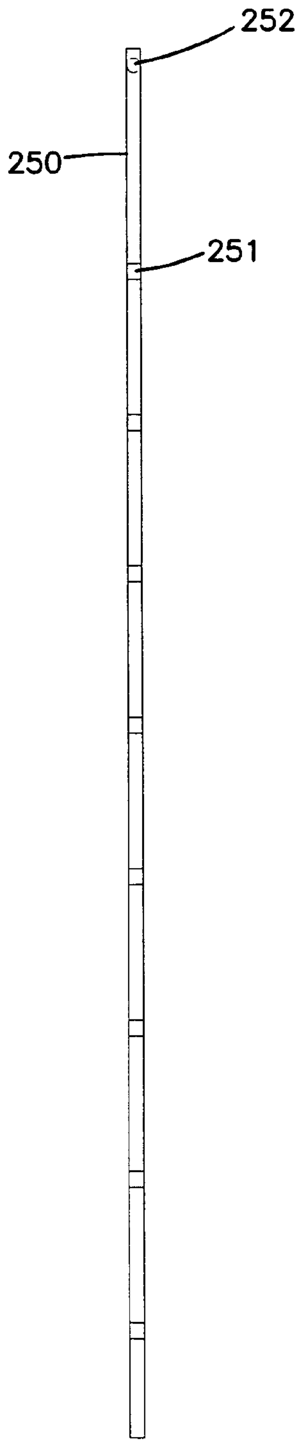
FIG. 23 is a top view of the row divider of FIG. 22.
Figure 24:
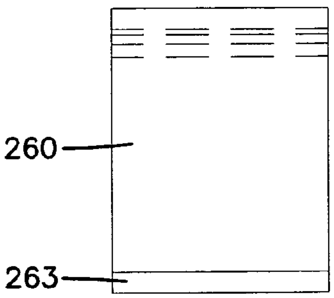
FIG. 24 is a front view of a blocking bar according to the invention.
Figure 25:
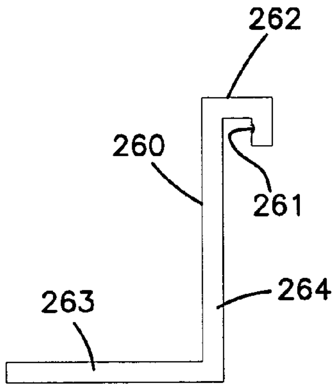
FIG. 25 is a side view of the blocking bar of FIG. 24.
Figure 26:
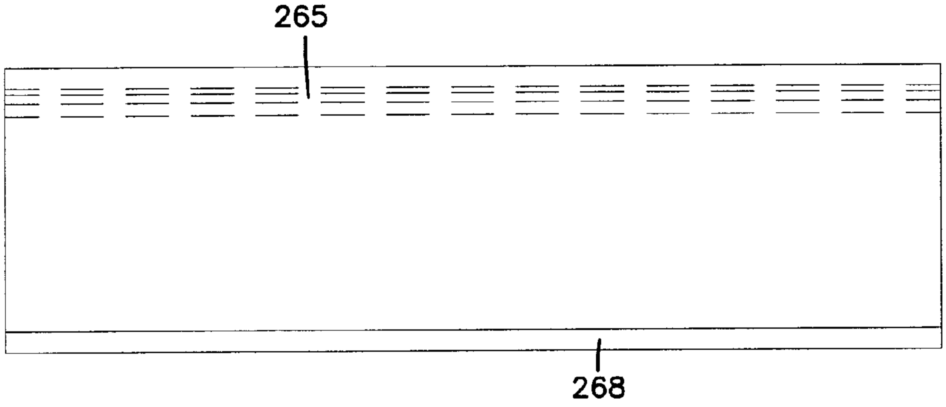
FIG. 26 is a front view of another blocking bar according to the invention.
Figure 27:
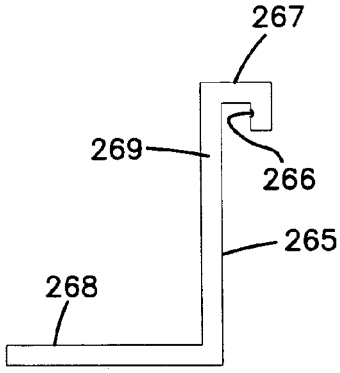
FIG. 27 is a side view of the blocking bar of FIG. 26.

The row divider 250, as shown in FIGS. 22 and 23, has a pin 252 extending downward from the bottom edge at one end, and openings 251 extending downward from the top edge. The pin 252 is sized to be received in the holes 233 in the sizing guide 230. The blocking bar 260, 265, as shown in FIGS. 24–27, has a horizontal leg 263, 268, a vertical leg 264, 269, and a hook 262, 267 with a recess 261, 266 sized to receive protrusion 245 on the column divider 240.

The pill and capsule counter shown in FIGS. 9–29 is used as follows. A template 300 is loaded with a blister pack card and inserted into the lower section 112 of the housing 210. The movable plate 220 is inserted into the housing 210 to the first position, shown in FIG. 10. A sizing guide 230 is selected based on the size of pill or capsule to be counted. The sizing guide 230 is inserted into the housing on top of the plate 220, matching the notched corner 232 of the sizing guide 230 with the marker 15 on the housing 210 such that the guide 230 fits within the housing chamber and is substantially aligned with and vertically displaced from the movable plate 220. Depending on the number of pills or capsules to be dispensed, and their desired arrangement in the blister pack, any combination of column divider 240, row divider 250 and/or blocking bar 260 may be used to separate the corresponding number of apertures 231 on the sizing guide 230.

The combination of column divider 240, row divider 250 and blocking bar 260 is used as follows. The pin 252 of row divider 250 is inserted into one of the holes 233 in the sizing guide 230, and the opposite end of row divider 250 is inserted into the corresponding slot 217 in the rear wall 206 of the housing 210. A column divider 240 is inserted into a pair of slots 16 in housing walls 7, 8, and over the row divider such that the openings 241 of the column divider mate with the openings 251 on the row divider. If the desired number and arrangement of pills or capsules to be dispensed into the blister pack card does not correspond with the total number of apertures 213 separated by the column and row dividers, one or more blocking bars 260 is used. A blocking bar 260 with a width corresponding to the number of apertures 213 to be blocked is selected. The hook 262 of the blocking bar 260 is placed over the column divider 240 such that the recess 261 on the blocking bar 260 engages the protrusion 245 on the column divider 240, and the horizontal leg 263 of the blocking bar 260 blocks the appropriate apertures 231.

Once the desired number and configuration of apertures 231 is separated, the pivoting cover 17 is closed and an excess of pills or capsules to be counted are placed into the separated region of upper section 111. The pill counter is tilted, rocked or shaken to distribute the pills or capsules into the apertures 231 in the sizing guide 230. The pivoting cover 17 is opened and the excess pills or capsules are brushed or shaken into the trough 13, leaving the desired number of pills or capsules in the apertures 231. The excess pills or capsules can be returned to the stock bottle by tipping the pill counter such that the excess pills or capsules exit the trough 13 through the opening 14. The pivoting cover 17 is closed and the flange 223 on the movable plate 220 is pressed, causing the plate 220 to move to the second, inserted position. As the plate moves inward, the apertures 221 move into register with the apertures 231 in the sizing guide 230 causing the pills or capsules to drop into depressions 310 in the template 300 in the lower section 212 of the housing 210. The template 300 is removed using handle 320, and the blister pack card containing the pills or capsules is removed and sealed using conventional means.

The pill counter is part of a system or kit including the housing, at least one movable plate, and at least one removable sizing guide. In another embodiment, the system or kit also includes at least one template for holding blister pack cards, at least one column divider, at least one row divider and at least one blocking bar. One example of a pill counting system includes a housing, a movable plate, four pill sizing guides (small, medium, large, extra-large), two capsule sizing guides (small-medium, large), a divider for pills, and a divider for capsules. Another example of a pill counting system includes a housing, a movable plate, three pill sizing guides (small, medium, large), two capsule sizing guides (small-medium, large), two column dividers, two row dividers, three blocking bars (one, two, and three aperture widths), and a blister pack card template.

The housing, movable plate, removable sizing guides, template, dividers and blocking bars can be made of any suitable durable material that is easily cleaned and sterilized, such as plastic, glass, metal, etc. The housing, movable plate and sizing guides can be made of clear plastic for easy visualization of the pills during the counting process.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A counter for pills and capsules comprising:

(a) a housing comprising at least one chamber;

(b) a movable plate removably positioned within the chamber and dividing the chamber into upper and lower sections, the plate movable from a first position to a second position, the plate having a plurality of apertures;

(c) at least one sizing guide, the sizing guide having a plurality of apertures, the sizing guide removably fitting within the chamber and substantially aligned with and vertically displaced from the movable plate; wherein when the movable plate is in the first position, the apertures in the plate and the apertures in the sizing guide are out of register, and when the plate is in the second position, the apertures in the plate and in the sizing guide are in register;

(d) at least one template having a plurality of cavities, the template removably fitting within the lower section of the chamber and substantially aligned with and displaced below the sizing guide and movable plate, the template and cavities sized to receive a container for pills or capsules; wherein when the movable plate is in the first position, the apertures in the plate and the cavities in the template are out of register, and when the plate is in the second position, the apertures in the plate and the cavities in the template are in register.

2. The counter of claim 1 further comprising an opening in the lower section of the chamber, wherein the opening is separated from the template, when inserted, by a barrier.

3. The counter of claim 2 wherein the barrier is a wall extending upward from a bottom of the housing to the plate, when inserted, such that the opening is accessible to the upper section and is separated from the template, when inserted.

4. The counter of claim 1 further comprising at least one removable divider adapted to fit within the upper section of the chamber to separate a portion of the sizing guide apertures corresponding to the desired number of pills or capsules to be counted.

5. The counter of claim 1 further comprising at least one blocking bar adapted to fit within the upper section of the chamber over at least one aperture of the sizing guide.

6. The counter of claim 1 comprising multiple sizing guides, wherein each sizing guide has apertures corresponding to a particular sized pill or capsule.

7. The counter of claim 1 wherein the apertures in the movable plate and sizing guide and the cavities in the template are arranged in the same pattern.

8. The counter of claim 7 wherein the apertures in both the movable plate and sizing guide and the cavities in the template are arranged in four rows of eight.

9. The counter of claim 1 wherein the housing comprises at least one trough, the trough open to the upper section of the chamber when the movable plate and sizing guides are present.

10. The counter of claim 1 wherein the movable plate is positioned between the sizing guide and the template.

11. A pill and capsule counting and dispensing system comprising:

(a) a housing comprising at least one chamber, the housing adapted to receive a plate dividing the chamber into upper and lower sections;

(b) a plate adapted to be movable from a first position within the chamber to a second position within the chamber, the plate having a plurality of apertures;

(c) a plurality of sizing guides, the sizing guides having a plurality of apertures corresponding to a particular size of pill or capsule, wherein each sizing guide has a single size of apertures, the sizing guides adapted to removably fit within the chamber in substantial alignment with and vertically displaced from the plate; wherein when the plate is in the first position, the apertures in the plate and the apertures in the sizing guide are out of register, and when the plate is in the second position, the apertures in the plate and in the sizing guide are in register;

(d) at least one template having a plurality of cavities, the template removably fitting within the lower section of the chamber and substantially aligned with and displaced below the sizing guide and plate, the template and cavities sized to receive a container for pills or capsules; wherein when the plate is in the first position, the apertures in the plate and the cavities in the template are out of register, and when the plate is in the second position, the apertures in the plate and the cavities in the template are in register.

12. The pill and capsule counting system of claim 11 further comprising at least one divider removably fitting within the upper section of the chamber to separate a region of the chamber corresponding to a desired number of pills or capsules.

13. The pill and capsule counting system of claim 12 comprising at least two dividers, wherein a first divider is sized to fit within the housing in a lengthwise orientation, and a second divider is sized to fit within the housing in a widthwise orientation, wherein the first divider has at least one opening extending downward from a top edge and the second divider has at least one opening extending upward from a bottom edge, wherein the openings on the first and second dividers mate when the first and second dividers are positioned within the housing chamber.

14. The pill and capsule counting system of claim 12 further comprising at least one blocking bar adapted to fit within the upper section of the chamber over at least one aperture on the sizing guide.

15. The pill and capsule counting system of claim 13 further comprising at least one blocking bar adapted to fit over the second divider to block at least one aperture on the sizing guide.

16. The pill and capsule counting system of claim 15, comprising three blocking bars, wherein a first blocking bar is sized to block one aperture on the sizing guide, a second blocking bar is sized to block two apertures on the sizing guide, and a third blocking bar is sized to block three apertures on the sizing guide.

17. A pill and capsule counting and dispensing system comprising:

(a) a housing comprising at least one chamber, the housing adapted to receive a plate dividing the chamber into upper and lower sections, the housing having first and second ends and an opening in the first end of the lower section of the chamber;

(b) a plate adapted to be movable from a first position within the chamber to a second position within the chamber, the plate having a plurality of apertures, wherein when the plate is inserted into the housing, the plate extends from the second end toward the first end, but does not reach the first end of the housing;

(c) a plurality of sizing guides, the sizing guides having a plurality of apertures corresponding to a particular size of pill or capsule, wherein each sizing guide has a single size of apertures, the sizing guides adapted to removably fit within the chamber in substantial alignment with and vertically displaced from the plate; wherein when the plate is in the first position, the apertures in the plate and the apertures in the sizing guide are out of register, and when the plate is in the second position, the apertures in the plate and in the sizing guide are in register, wherein when the sizing guide is inserted into the housing, the sizing guide extends from the second end toward the first end, but does not reach the first end of the housing;

(d) at least one template having a plurality of cavities, the template removably fitting within the lower section of the chamber and substantially aligned with and displaced below the sizing guide and plate, the template and cavities sized to receive a container for pills or capsules; wherein when the plate is in the first position, the apertures in the plate and the cavities in the template are out of register, and when the plate is in the second position, the apertures in the plate and the cavities in the template are in register;

wherein the opening in the housing is separated from the template, when inserted, by a wall extending upward from a bottom of the housing to the plate, when inserted, such that the opening is accessible to the upper section of the housing and is separated from the template, when inserted.

* * * * *